United States Patent

Utting et al.

[11] Patent Number: 5,615,215
[45] Date of Patent: Mar. 25, 1997

[54] EXTENDED RANGE TDMA SYSTEM

[75] Inventors: Ross G. Utting, Bardon; Colin Rudolph, Carlingford, both of Australia; Laurent Girardeau, Courbevoie, France

[73] Assignee: Alcatel N.V., Rijswijk, Netherlands

[21] Appl. No.: 477,241

[22] Filed: Jun. 7, 1995

[30] Foreign Application Priority Data

Jun. 8, 1994 [AU] Australia .................................. PM6128
Mar. 21, 1995 [AU] Australia .................................. PN1823

[51] Int. Cl.$^6$ .............................. H04B 7/212; H04B 7/26
[52] U.S. Cl. ...................... 370/337; 379/59; 455/33.4; 455/54.1; 455/57.1
[58] Field of Search .................... 370/75, 95.1, 95.3, 370/97, 105.1; 379/58, 59, 60; 455/33.1, 33.4, 52.1, 53.1, 54.1, 56.1, 57.1, 55, 16, 7, 11.1, 13.1

[56] References Cited

U.S. PATENT DOCUMENTS

| | | | |
|---|---|---|---|
| 4,144,411 | 3/1979 | Frenkiel | 379/60 |
| 4,578,815 | 3/1986 | Persinotti | 455/15 |
| 4,704,733 | 11/1987 | Kawano | 455/16 |
| 4,727,590 | 2/1988 | Kawano et al. | 455/33.4 |
| 5,152,002 | 9/1992 | Leslie et al. | 455/11.1 |
| 5,483,537 | 1/1996 | Dupuy | 370/95.3 |

*Primary Examiner*—Hassan Kizou
*Attorney, Agent, or Firm*—Sughrue, Mion, Zinn, Macpeak & Seas

[57] ABSTRACT

A TDMA radio communication system such as GSM has a limited time period (td) over which the transmission from a mobile station (MS1 ... MS5) can be advanced to allow for the transit time of the signal between the mobile and the base station (BS), and this limits the maximum range of the system to radius R1. By co-locating a first transceiver (TX1/RX1) operating on a first frequency band (F1) and a second transceiver (TX2/RX2) operating on a second frequency band (F0), and delaying the reception time slots of RX2 by td, the first transceiver can be used for communication up to radius R1, and the second transceiver can be used for communication for mobiles between radius R1 and radius R0. Idle mobiles are instructed to camp on F0 and RX1 is switched during access request periods to look for access requests on F0.

14 Claims, 8 Drawing Sheets

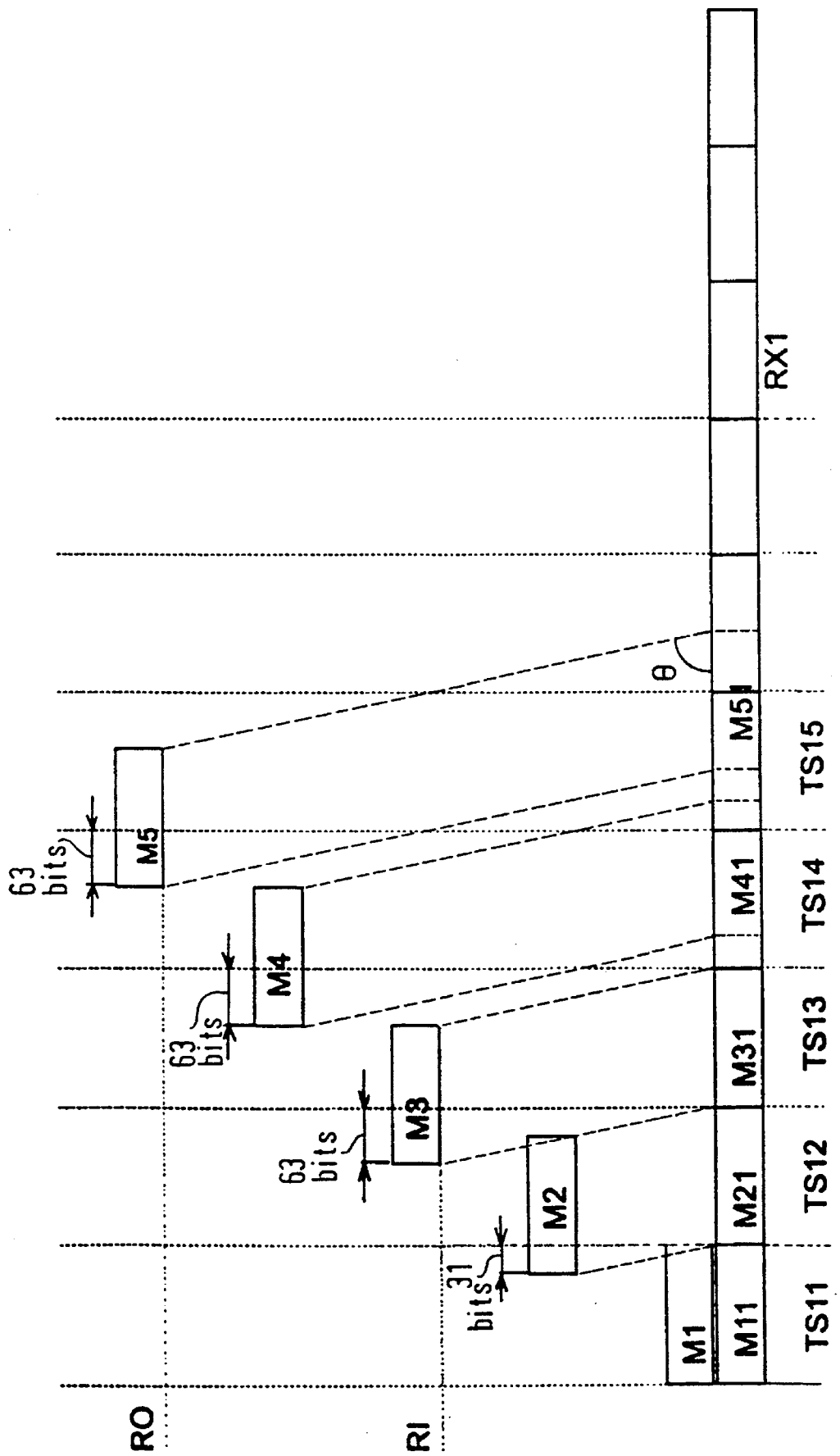

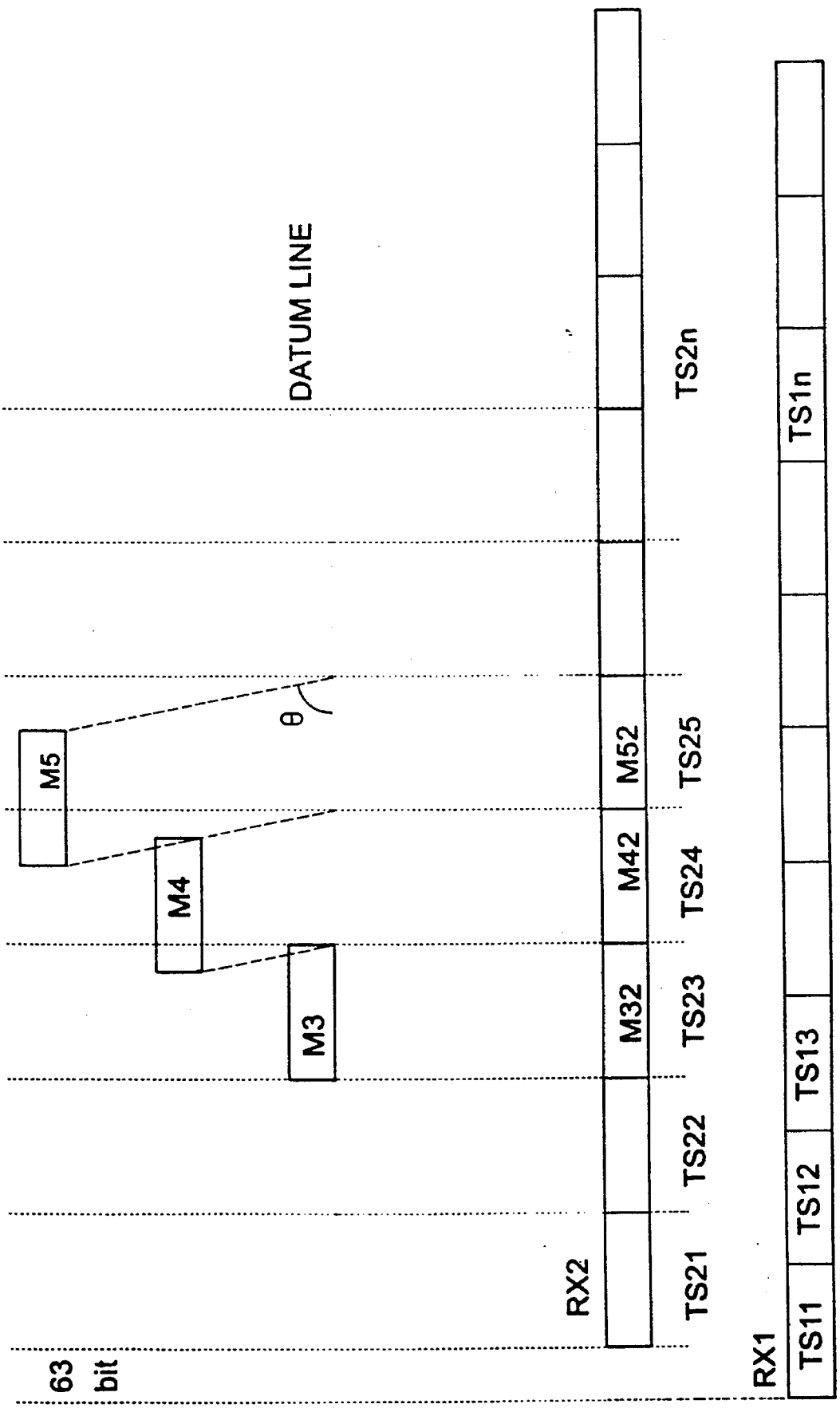

EXTENDED RANGE TDMA SYSTEM

BACKGROUND OF THE INVENTION

This invention relates to an arrangement for extending the range of radio coverage in a TDMA (Time division Multiple Access) system. The invention will be described with reference to a digital GSM cellular radio system using TDMA, but is applicable to certain classes of TDMA systems generally.

Radio TDMA systems are particularly useful when a central transceiver deals with a plurality of remote transceivers. However, the distance between the remote transceivers and the central transceiver introduces propagation delay which varies in direct proportion to the distances the remote transceivers (mobiles) are located from the central transceiver (base station).

To prevent adjacent transmissions from mobiles overlapping in time due to propagation delay it is necessary to control the times allocated for transmission (timeslots) from the mobiles. To maximise information throughput it is well known that each individual remote transceiver can be instructed to advance the starting time of its transmission in order to compensate for the propagation delay and to maximise spectrum efficiency.

Cellular radio telephone systems divide a coverage area into a plurality of contiguous or overlapping cells each served by a base station. In urban areas, the coverage of each cell may be only a few kilometers in diameter, cell size being reduced as the communication traffic density increases.

As the traffic density decreases the size of the cells can be increased provided radio coverage remains adequate for successful communication. The protocol adopted by GSM permits mobiles to advance their timing by a maximum of 63 communication bits. This is equivalent to approximately 35 kilometers. Once the mobile exceeds this distance it cannot be instructed to advance its timing any further, Consequently the base station receiver will eventually be unable to correlate the received mobile transmission once the optimum timing advance becomes too great. Transmissions from beyond 35 Km will then overlap into the following timeslot at the base station receiver.

Radio propagation conditions are favourable for extending the range of a GSM communication system beyond 35 kilometers when the base station is located atop a central highpoint (e.g., 300 meters) and the surrounding intended coverage area is largely flat. Under these circumstances it is far more economic to extend the coverage area of the base station beyond 35 kilometers than to install additional sites and base stations.

SUMMARY OF THE INVENTION

This specification discloses a method of increasing the range of a TDMA base station having a first transmitter associated with a first receiver, and a second transmitter associated with a second receiver, the first transmitter/receiver pair operating on first allocated up link and down link frequencies, the second transmitter/receiver pair operating on second allocated frequencies, wherein the base station is capable of communicating with each of a plurality of mobile stations over either the first or the second transmitter/receiver pair, the first transmitter/receiver pair being adapted to communicate with mobile stations within a first radius from the base station, and the second transmitter/receiver pair being adapted to communicate with mobile stations between the first and second radius from the base station, each mobile station communicating with the base station being allocated an uplink time slot in an uplink channel with either the first or the second transmitter/receiver pair, each uplink time slot including a time buffer approximately equivalent to the round trip delay between a mobile at the first radius and the base station, uplink transmissions from each mobile being adjustable within the corresponding time buffer to enable correct reception at the base station, the method including:

causing all idle mobile stations to camp on the second allocated uplink and downlink frequencies; enabling the first receiver to receive both the first allocated uplink frequencies and the second allocated uplink frequencies, synchronizing the epoch duration and commencement of the time slots of the epoch second allocated downlink frequencies with the duration and commencement of the time slots of the first allocated downlink frequencies, wherein the time slots of the second allocated uplink frequency are delayed with respect to the time slots of the first allocated uplink frequency by an amount approximately equal to the buffer time, whereby uplink access signals from a mobile station within the range between the first and second radii on the second allocated uplink frequency can be received by the second receiver, and whereby uplink access signals from a mobile station within the first radius on the second allocated uplink frequency can be received by the first receiver, wherein a mobile station is allotted to the first or second transmitter/receiver pair depending on whether its uplink access signals were received by the first or second receiver.

BRIEF DESCRIPTION OF THE DRAWINGS

The invention will be more fully described with reference to the accompanying drawing, in which:

FIG. 3a to 3b show the time relationships between various transmissions in accordance with an embodiment of the invention;

DESCRIPTION OF THE INVENTION

In one embodiment, two GSM cells are located at one site. The Outer cell has a control channel (BCCHo) and a time base structure on the downlink (base station to mobile) at a frequency Fo and a similar timebase structure on the uplink (mobile to base station). There may be a frequency offset between the uplink and downlink channel frequencies. As an example there is always a 45 MHz offset between the associated uplink and downlink frequencies in the GSM system. The Outer cell maintains communication with mobiles in area 3 shown in FIG. 1.

The inner cell has a control channel (BCCHi) at frequency (Fi) and a downlink timebase structure and a corresponding uplink timebase structure. The Inner cell maintains communication with mobiles in area 2. While areas 2 and 3 are shown as circular, the coverage need not be over the whole of the area.

Both cells may have a fixed time offset between the uplink and downlink timebase (Tf) depending on the TDMA system. In GSM there is a fixed offset of 3 timeslots between: the transmission by the base station and the commencement of transmission by the mobile. In addition, in accordance with our invention, there has been introduced into the Outer cell an additional delay (Td) which delays the commencement of reception by the Outer cell receivers. In GSM, by introducing a delay equal to approximately 63 GSM transmission bits the Outer cell receiver's reception windows are able to receive transmissions from mobiles located within the 35–70 kilometer radius of the base station.

In a TDMA system there are usually a number of predefined periodic timeslots (t0, t1, t2, t3, t4 ... tn). On the receiver control channel a number of these timeslots (not less than 1) are assigned the function of detecting Mobile Access attempts on the uplink and sending Channel assignments on the downlink. On the simplest GSM implementation only one timeslot out of the 8 possible timeslots is used for this control function.

When located outside a radial distance equivalent to the propagation delay Td, if the Mobile attempts an access on the Outer cell uplink control channel Fo, this is received on the Outer cell uplink receiver. The system allocates a Channel assignment which is sent on the Outer cell downlink and transmitted on the Downlink Broadcast Control channel, BCCHo. The mobile responds to the Channel assignment and continues to communicate with the Outer cell on the assigned frequency and timeslot.

Figure 1:
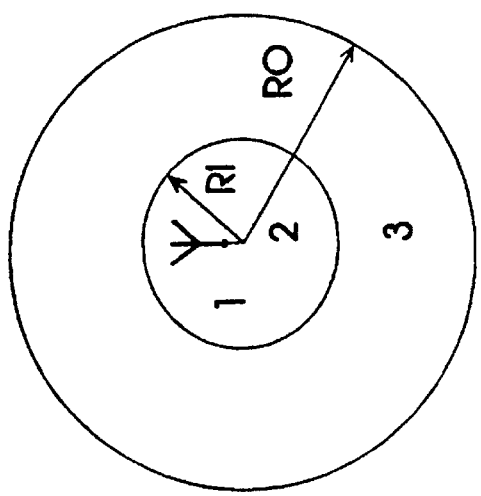
FIG. 1 shows concentric coverage areas around a base station.

FIG. 1 shows the coverage area of two GSM transmitter/receiver pairs or transceivers located at base station 1.

The transmitter of the inner transceiver operates at $F_i$ and the receiver of the inner transceiver operates on a frequency displaced from $F_i$ by a fixed amount e.g. −45 MHz. This receiver is arranged to receive transmissions from mobiles within the inner coverage area 2 which has a radius of approximately 35 Km determined by the GSM time buffer of 63 bits.

The outer transceiver's transmitter operates on a frequency $F_o$ and its receiver at $F_o$−45 MHz. This second receiver is arranged to receive transmissions from mobiles within the outer coverage area 3. This is achieved by delaying the time slot windows for this second receiver by an amount approximately equal to the buffer time. The second receiver may be delayed by slightly less than the buffer time to provide an overlap zone to prevent the mobile "hunting" between the coverage zones.

While only two concentric zones have been shown, a plurality of concentric zones may be allowed for by having a plurality of transceivers, each having its receiver delayed by a multiple of the buffer time.

According to the invention, the timeslots of the transmitter of the second transceiver (i.e. the second downlink) are synchronized with the timeslots of the first downlink, and the timeslots of the receiver of the second transceiver (i.e.

the second uplink) are delayed in time relative to the time slots of the first uplink by an amount approximately equal to the time buffer. This enables the second receiver to receive signals from twice the maximum distance that the first receiver covers. Additional receiver means tuned to the outer cell uplink frequency ($F_o$−45 MHz) and synchronized with the inner cell uplink receiver are also provided.

Figure 2:
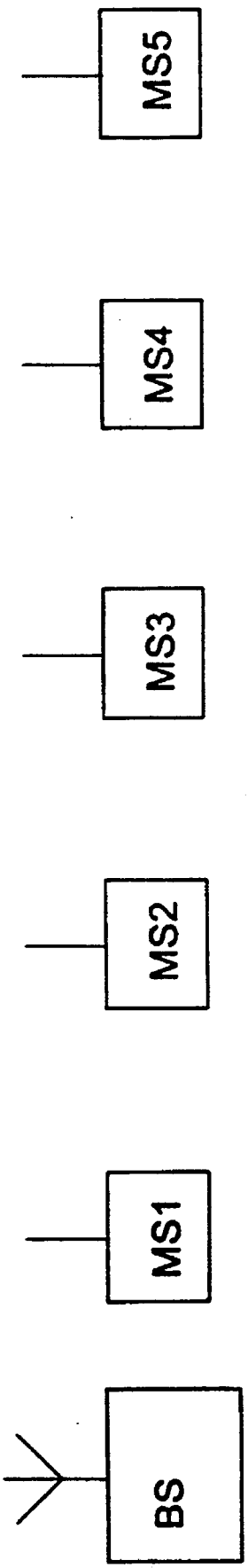
FIG. 2 shows several mobile stations at differing distances from a base station.

With reference to FIG. 2, a plurality of mobile stations MS1 to MS5 are shown at different distances from base station BS.

The BS instructs each mobile to advance its transmission within the buffer time in proportion to the distance between the mobile and BS.

MS1 is in the immediate vicinity of BS (<500 m) and it is instructed to advance its transmission by zero bits. Its message is received in TS11 as M11.

MS2 is approximately 17.5 Km from BS and it is instructed to advance its transmission by about 0.5 Td (e.g. 31 bits). Its message is received in TS12 as M21.

MS3 is at 35 Km from BS, i.e. at the limit of the inner cell radius and, assuming it is communicating with the inner transceiver (TX1, RX1) on frequency Fi, it is instructed to advance its transmission by 63 bits. Its message is received in TS13 as M31.

MS4 and MS5 are out of range of the inner transceiver, being at about 52 Km and 70 Km from BS. Message signals from these mobiles arrives at the inner transceiver overlapping into the following time slots, even when fully advanced by 63 bits, as shown in FIG. 3a by M41 and M51, which overlap into the adjacent time slots.

FIG. 3a represents the five mobiles, M1 near the base station, M2 at about 17.5 Km from the base station, M3 at about 35 Km (R1) from the base station, M4 at about 52.5 Km from the base station, and M5 at about 70 Km (RO) from the base station. The contiguous rectangles at the bottom of the figure represent the time slots TS11, TS12 ... of the receiver RX1. The vertical lines represent the starting points of the time slots.

The vertical distance of the mobiles from the top of the time slots may be visualised as their physical distance from the base station and their horizontal displacement is an indication of the time displacement of their transmission burst with respect to the start of time slot TS11.

The sloping dotted lines joining the mobiles M1 to M5 to the time slots TS11 ... can thus be considered as a representation of the radio waves travelling between the mobiles and the base station. The angle $\Theta$ which the sloping lines make with the horizontal lines is defined by:

$$\tan\theta = \frac{D}{t},$$

where D is the vertical distance of a triangle of which the sloping line forms the hypotenuse and the base of which is t, which is proportional to the time for the radio signals to travel the round trip distance 2D.

Thus:

$$\tan\theta = \frac{D}{t} = \frac{C}{2}$$

where C is the speed of the radio waves. From this the time t by which a transmission is to be advanced can be calculated as:

$$t = \frac{2D}{C}$$

In other words the sloping line originating at the start of one of the time slots of RX1 indicates the amount by which a transmission must be advanced in order for the transmission to be receivable in that time slot. Because the maximum advance available in GSM is 63 bit periods, corresponding to the advance of M3 at R1, mobiles outside R1 cannot be received by RX1. This is illustrated by the fact that the sloping lines from M4 at angle e do not coincide with the start and end of TS14 but overlap across TS14 and TS15, even though M4 is advanced by the maximum 63 bits. Thus RX1 cannot receive information from M4. Similarly M5 cannot be received by RX1.

However, transmissions from M1, M2 and M3 arrive at the correct times to be received in time slots TS11, TS12 and TS13 respectively.

FIG. 3b show,, the effect of delaying the time slots of RX2 by 63 bits with respect to the time slots of RX1. The delay can be illustrated as having the effect of moving the receiver. RX2 out to the distance whose round trip delay is equivalent to 63 bits, i.e. R1 becomes the datum line for RX2. Thus M3, which is physically at distance R1 from the centre (and from RX2), is now electrically in the equivalent position with respect to RX2 that M1 has in relation to RX1. In other words, M3 must have zero advance to be received by RX2. The radius R1 now becomes the datum line for RX2. Thus M4 is effectively 17.4 Km from the datum line and needs to be advanced by 31 bits while M5 is 35 Km from the datum line and needs to be advanced by 63 bits. The sloping lines from M4 and M5 to the intersection of the time slot lines with the datum line make the same angle e as the sloping lines in FIG. 3a.

Figure 4:
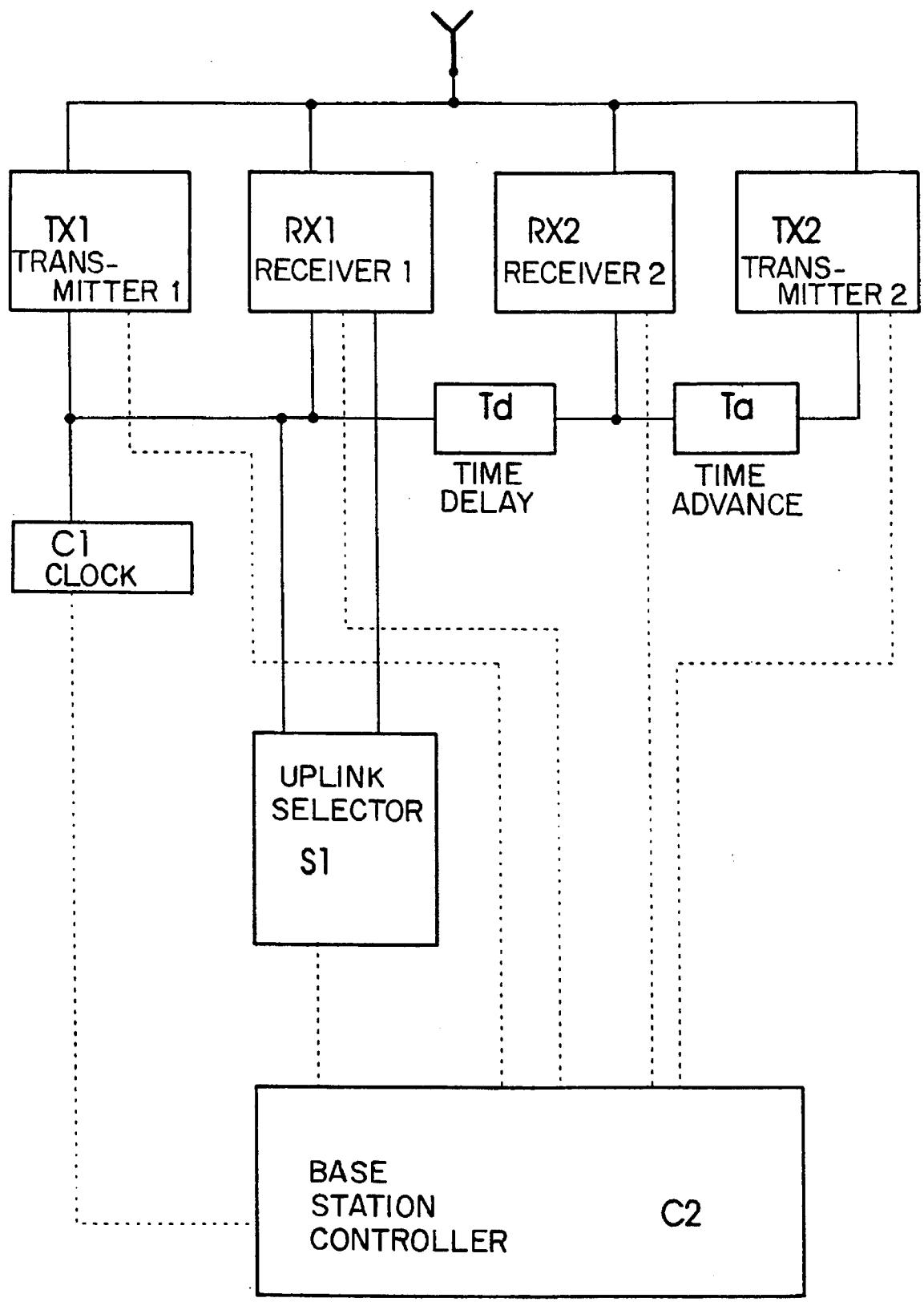
FIG. 4 is a block diagram illustrating the co-location of two transmitter/receiver pairs embodying the present invention.

FIG. 4 shows a block diagram illustrative of an arrangement in which the invention may be implemented.

The arrangement includes a first transceiver, TX1/RX1, arranged to serve the inner cell, and a second transceiver, TX2/RX2, arranged to serve the outer cell.

Clock C1 controls the time bases for the uplink and downlink time slots for the two transceivers.

The uplink time slots for the second transceiver's receiver, RX2, are delayed by delay Td, as shown in FIG. 3 (d). The downlink timeslots for TX2 are restored to synchronism with those of TX1 via clock advance Ta.

Base station controller C2 supervises the overall operation of the base station, and may be programmed to control the switching of the inner uplink between Fi and Fo. The uplink selector $1 may be used in one embodiment to tune RX1 to the inner or outer uplink frequency as required. In another embodiment it may be used to select the output of one of a pair of receiver devices each tuned to a difference one of the inner and outer uplink frequencies.

FIG. 4 shows schematically an arrangement for implementing the control of the transmission and reception channels of the inner and outer transceivers. The time base for the transmission timeslots of TX1 is derived directly from clock C1, as is the time base for the receive time slots of RX1.

The time base for the receive time slots of RX2 is derived from C1 via the delay Td equal to (or slightly less than) the buffer time (63 bits), while the time base for the time slots of TX2 is derived from the restored clock C1 by advancing the output of delay Td by the same amount as the delay period of Td.

Thus TX1 and TX2 transmit in synchronism on corresponding frequencies Fi and Fo.

Receiver RX2 is delayed with respect to RX1 by Td and RX1 is tuned to Fo–450 MHz during its access channel time slot and RX1 is tuned to Fi–450 MHz for other time slots. Thus RX1 is capable of receiving access requests sent on the RX2 frequency from mobile stations within the inner cell, while RX2 receives access requests on its own frequency from mobiles in the outer cell.

Figure 5:
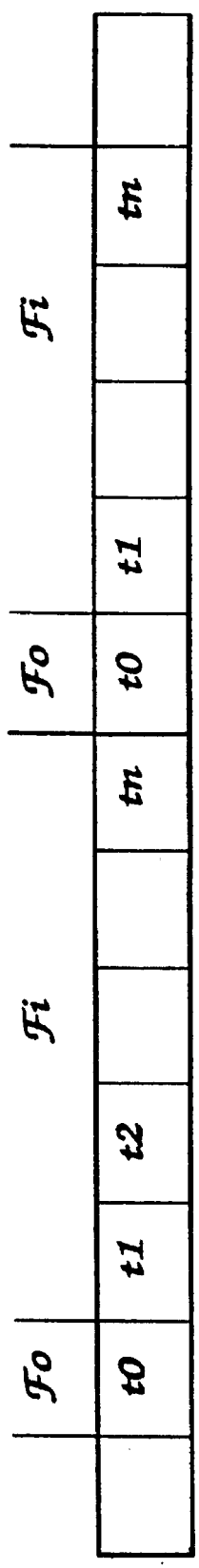
FIG. 5 shows the frequency/time relationship of an inner receiver embodying the invention.

FIG. 5 shows the frequency/time slot relationship of RX1 according to an embodiment of the invention in which the frequency of RX2 is switched from its "normal" frequency Fi–45 MHz to Fo–45 MHz during its access channel time slot to. For t i to t n, RX2 returns to its normal frequency.

Figure 6:
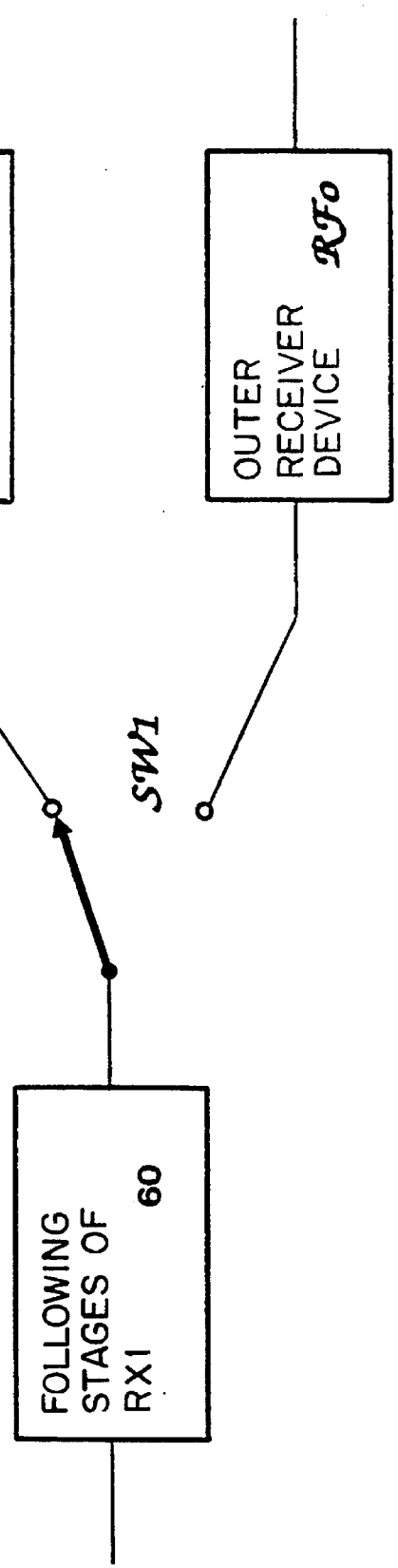
FIG. 6 shows a block diagram of a receiver used in a one embodiment of the invention.
Figures 7, 8:
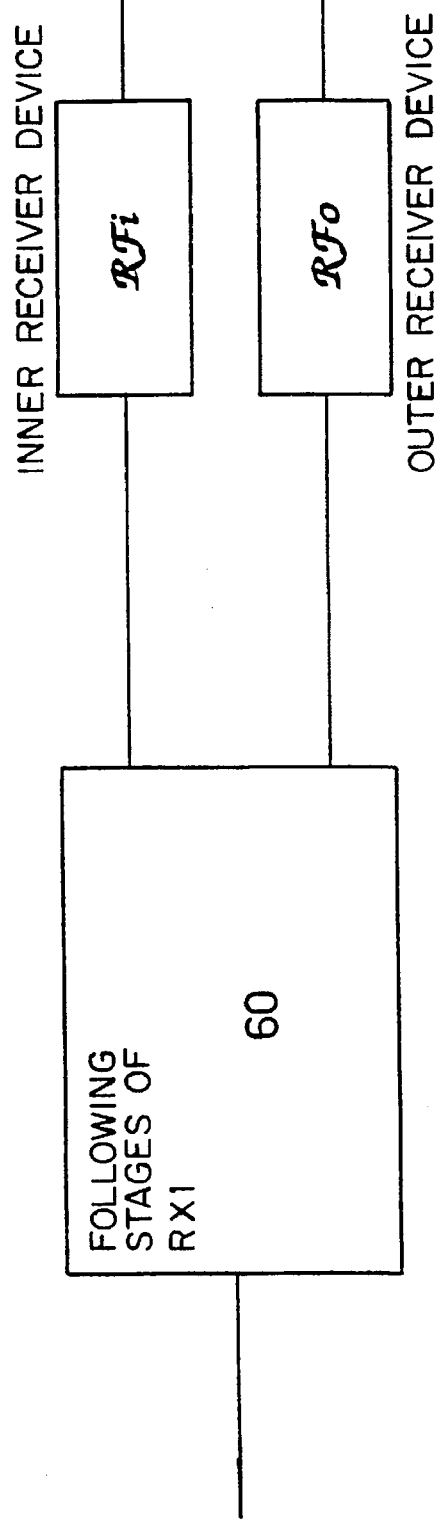
FIG. 7 shows the time slot arrangement of the embodiment of FIG. 6.
FIG. 8 shows a block diagram of a receiver used in a further embodiment of the invention.
Figure 9:
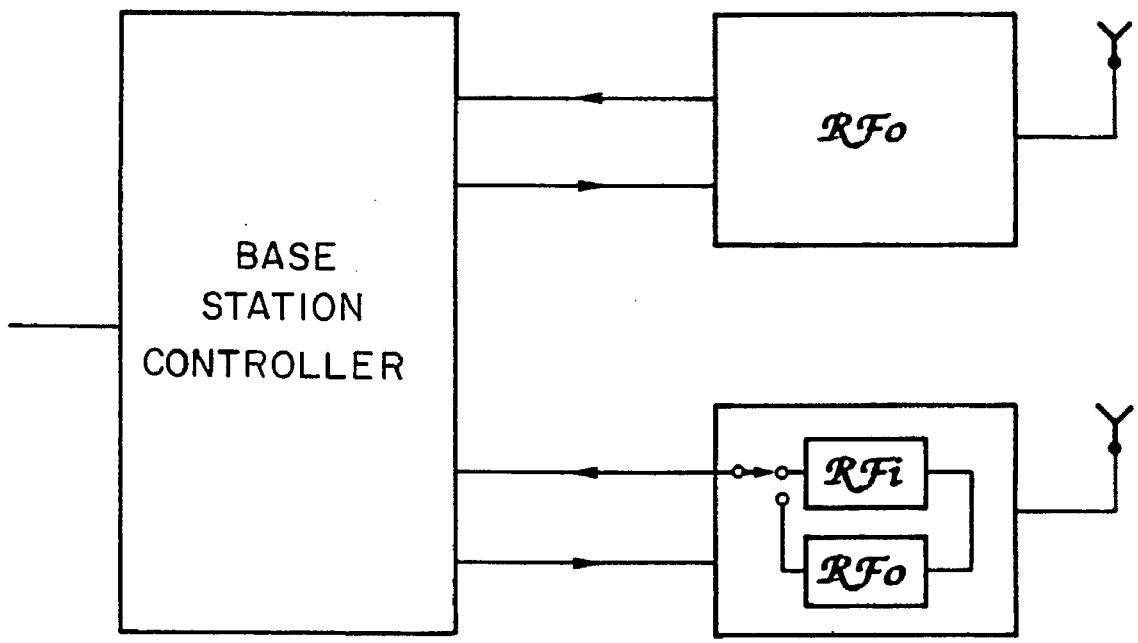
FIG. 9 shows an alternative receiver block diagram.

FIG. 6 shows an alternative embodiment to achieve the result shown in FIG. 5. In FIG. 6, RX1 includes first and second receiver devices, $R_{Fi}$ and $R_{Fo}$, which are permanently tuned to the inner and outer uplink frequencies respectively. A switch SW1 switches between the receiver devices according to the pattern shown in FIG. 5. Thus the appropriate signals are passed on to the following stages 60 of RX1 for processing. In FIG. 7, (a) is the output of RFi, (b) is the output of RFo and (c) is the input to 60.

FIG. 8 shows an alternative embodiment to that shown in FIG. 6. In this embodiment the first and second receiver devices, $R_{Fi}$ and $R_{Fo}$, of RX1 are again tuned to the inner and outer uplink frequencies respectively. In this case $R_{Fi}$ and $R_{Fo}$ both try to correlate with the input signal, and only the output of the successful receiver device is passed on for further processing.

When a mobile phone is idle it must maintain basic communication with the network to enable it to make and receive calls. To this end an idle mobile needs to "know" which cell it is in and what the adjoining cells are, i.e., it needs to know what frequency to listen to or to camp on. The basic manner in which a mobile identifies its location is by measuring the signal strength from a group of cells in the locality, each cell having a different frequency. Normally a mobile will camp on the cell having the strongest signal. Signal strength may be affected by geographical or architectural obstructions and, when the mobile is engaged on a call, it needs to take account of these factors by e.g., incorporating a time delay before initiating a handover. This helps to avoid unnecessary handovers.

Thus when a mobile is idle it will tend to camp on the strongest broadcast control channel frequency.

Mobile stations may be caused to camp on the outer cell frequencies in a number of ways by sending "information" from the base station. One method is to cause TX2 to transmit at higher power than TX1 as mobiles are programmed to home on the strongest signal.

The power difference required will depend on the cell selection algorithm hysteresis. An additional "safety factor" may be used to allow for random radio variations.

We have found that, due to radio shadows, the simple expedient of relying on the programming of the mobile phone to select the strongest signal and causing the base station to transmit the outer cell at higher power did not cause the idle mobiles to always camp on the outer cell BCCH.

We therefore cause the inner cell to transmit a cell barring signal on the BCCH at the inner cell frequency. This consists of a flag in the BCCH which is recognized by the mobile as an instruction not to camp on that frequency. This has the result of forcing the mobile to camp on the outer cell frequency irrespective of the relative signal strengths from the inner and outer cell transmitters.

In a preferred application we use equal power for the inner and outer transmitters.

As an alternative method of causing the mobiles to camp on the outer cell, use may thus be made of a feature of GSM.

This feature involves transmitting a message which indicates to the mobile stations not to camp on the particular cell. Thus mobiles can be caused to avoid the inner cell and camp on the outer cell.

It is also necessary to ensure that the mobile station which has sent an access request is able to receive the access grant message from the base station.

The idle mobile is camped on the outer cell so it is listening on the outer down link control channel for the access grant, i.e. it is tuned to Fo. However, if the mobile is within the inner cell, its access request sent on Fo–450 MHz will be received by RX1 which is tuned to Fo–450 during its access request reception time slot. Thus, when the mobile is in the inner cell, an access grant message will be sent by TX1 on Fi. The mobile is not able to receive this information.

Thus according to one embodiment of the invention, the base station control causes the access grant to be transmitted on both Fi by TX1 and Fo by TX2.

According to an alternative embodiment, the base station control causes TX1 to transmit access grants on Fo.

It had been assumed that when an idle mobile was in a concentric cell arrangement and transmitted an access request then the request would be received by the receiver tuned to the frequency on which the request was sent, if the mobile was within the range covered by that receiver, and if a specified number of such access attempts were unsuccessful, the mobile would automatically attempt to access the other of the concentric cells, so that the call could be established in this manner. However trials proved that calls could not be established reliably in this manner under some circumstances.

To overcome this problem we have developed an arrangement in which idle mobiles within the service area of concentric cells are caused to camp on the BCCH frequency of the outer cell. This means that access attempts from mobiles in the outer area can be processed normally, but the system required modification to enable calls to be established from a mobile in the inner cell as the uplink random access channel of the outer cell could not properly correlate access requests from the mobile in the inner cell. To this end we provided additional receiver means tuned to the frequency of the outer cell BCCH, but synchronized in time with the inner cell BCCH. Thus the additional receiver means is able to receive access requests on the outer cell frequency from mobiles located within the inner cell.

While the third receiver means has been described and illustrated as consisting of a separate receiver, it may in practice be implemented by switching the tuning of the inner receiver to the outer uplink frequency RFo during the Random Access Channel (RACH) period (i.e. time slots after the inner downlink BCCH). Reference to the third receiver means should be understood to include this implementation.

The additional receivers for the intermediate coverage areas may be implemented in a similar manner.

It should be noted that the idle mobiles are barred from camping on the inner cell so no access attempts would be made on the RACH of the inner receiver at the inner receiver frequency RFi.

Figure 10:
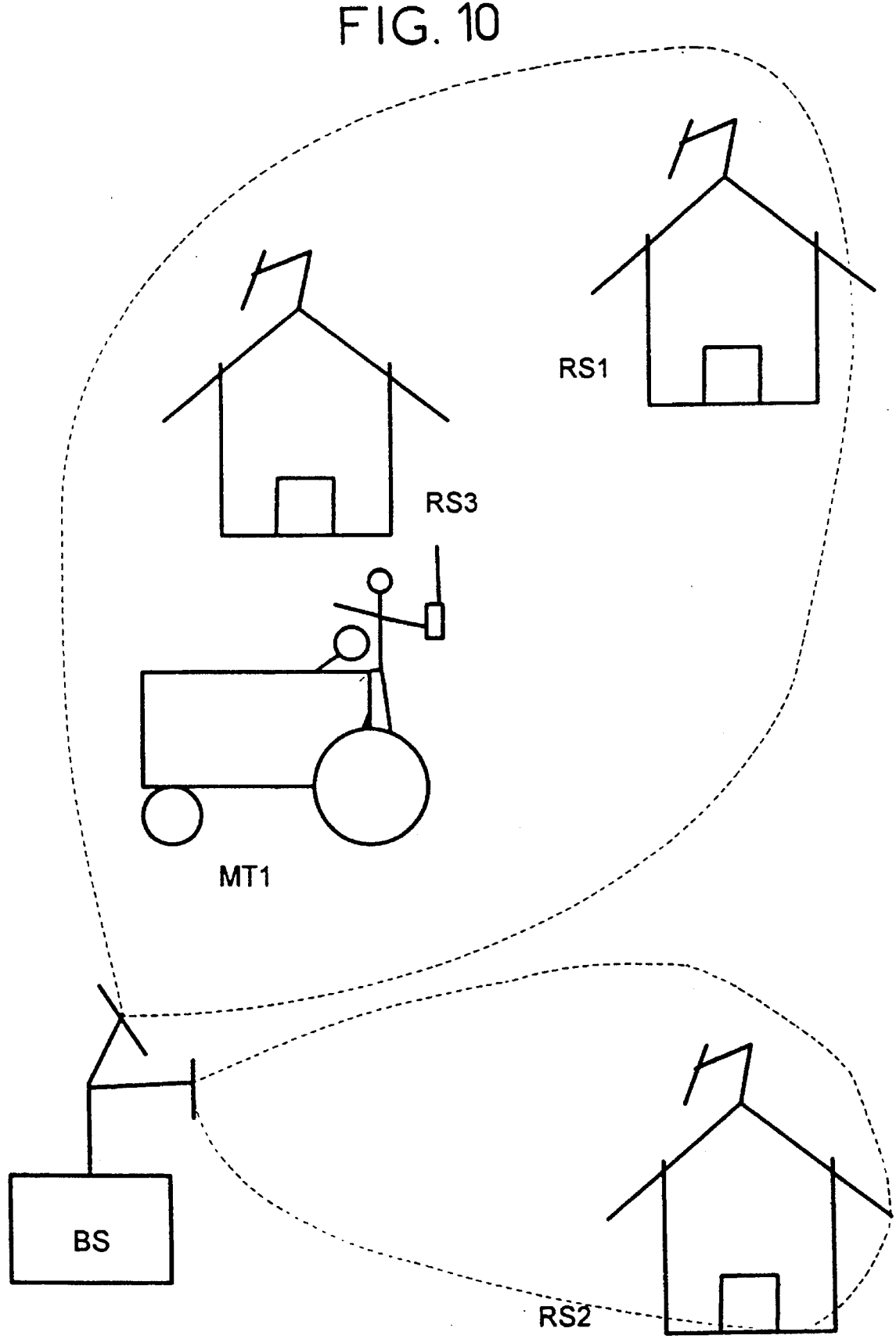
FIG. 10 shows a radio-in-the loop telephone service.

A further application of the extended cell technique is in a "radio-in-the-loop" telephone service (see FIG. 10). In some applications, particularly where there are a few remote subscribers, (RS1, RS2, RS3), the cost of running wire cable to the subscribers may be large, and the cost of maintenance may also be large.

The base station BS need provide only sectional coverage, as shown in FIG. 10.

We therefore propose the use of a base station to provide GSM coverage to the remote subscribers who may have fixed transceivers powered from a local generator or from the electricity supply lines, thus obviating the inconvenience of the limited life of portable batteries.

The arrangement would also have the advantage of permitting a person working at a distance from a farmhouse to communicate with the farmhouse by telephone via the GSM base station as long as the person remained within radio coverage of the base station.

The handover operation in a number of specific circumstances will be described with reference to FIG. 11.

Figure 11:
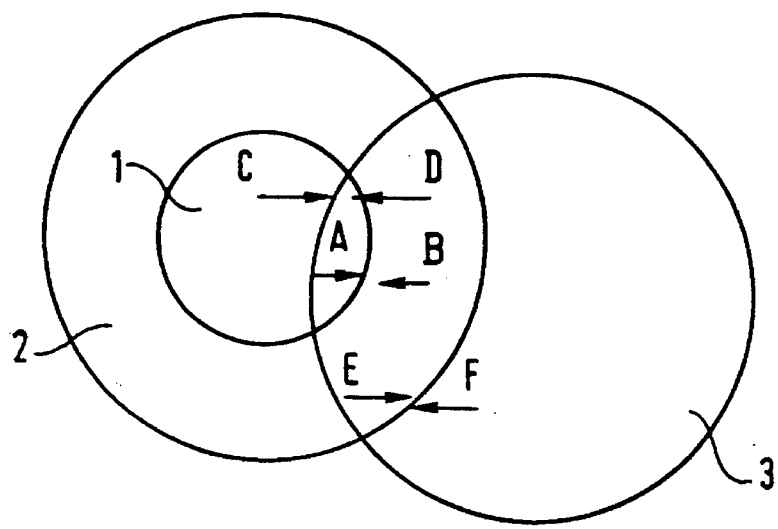
FIG. 11 shows an overlapping cell configuration.

FIG. 11 shows a pair of concentric cells 111 and 112 and an overlapping cell 113 which intrudes into both areas 111 to 112.

Handover in the following circumstances will be considered:

A: A mobile station MS moving from cell 1 to cell 2;
B: A mobile station moving from cell 2 to cell 1;
C: A mobile station moving from cell 1 to cell 3;
D: A mobile station moving from cell 3 to cell 1;
E: A mobile station moving from cell 2 to cell 3;
F: A mobile station moving from cell 3 to cell 2;

The GSM system has a requirement that handover can be triggered by a number of factors including distance, signal level, signal quality (synchronization), and power budget and these may be implemented in different ways by different manufacturers.

In case A where a mobile is moving from cell 1 to cell 2, the mobile will report back to the base station control that it is approaching the time advance limit of 63 bits e.g. when it reaches 62 bits. The base station control then instructs the mobile to switch to the frequency of cell 2. If the mobile cannot successfully achieve the hand-over for any reason it is programmed to try the next best cell from a list of adjoining cells sent by the base station controller to the mobile and the mobile monitors the level from these cells during the time slots when it is not receiving or transmitting. In this example the second choice would be cell 3.

In case B the mobile is moving from cell 2 to cell 1. One way in which the hand-over could be triggered would be to program the base station to instruct the mobile to switch to cell 1 when the time advance fell below 1. In an alternative, both the base station and the mobile monitor signal quality and this can be used to trigger the hand-over. The mobile will report a deterioration in quality as the mobile moves across the O bit advance boundary or the base controller will detect it to trigger the hand-over because of the loss of synchronization.

Cell 3 again would be the second choice.

In case C the MS is moving from cell 1 to cell 3. This would normally only occur where cell 2 was not first choice due to propagation problems e.g. fading etc. The hand-over could be triggered on any criteria except distance where the normal first try hand-over would be to cell 2 with cell 3 as second choice as for case A. If the mobile reports that it has reached the threshold of any of these criteria, and that cell 3 is the best option, the changeover to cell 3 will be initiated by the, base station controller.

In case D the mobile is moving from cell 3 to cell 1. The mobile if programmed to try the best neighbouring cell from a list of cell frequencies sent to it by the base station controller and will request the base station controller to authorise a change-over to the cell which provides the best power budget for the mobile, i.e. to the cell where the mobile is required to use the least power to transmit./ Thus if the mobile is closer to the antenna of cell 1 than that of cell 3 it will be switched to cell 1.

In case E the mobile is moving from cell 2 to cell 3. This is similar to case C.

In case F the mobile is moving from cell 3 to cell 2. This is similar to case D.

The claims defining the invention are as follows; we claim:

1. A cellular radio communication arrangement including a cellular base station having two or more continuous or overlapping coverage areas and a corresponding TDMA transceiver associated with each coverage area, including at least:

an inner transceiver including a first receiver adapted to receive first incoming signals from an inner coverage area, and a first transmitter adapted to transmit first outgoing signals at least to the inner coverage area: and an outer transceiver having a second receiver adapted to receive second incoming signals from an outer coverage area, and a second transmitter adapted to transmit second outgoing signals at least to the outer coverage area;

and an additional third receiver adapted to receive third upcoming signals from the inner coverage area:

wherein the first and third receivers operate according to respective first and third receiver time frames which are synchronized:

wherein the second receiver operates according to a second time frame which is delayed with respect to the first and third time frames by a predetermined delay period;

wherein the first receiver receives the first incoming signals at a first uplink frequency associated with a first downlink frequency transmitted by the first transmitter;

wherein the second and third receivers receive, respectively, the second and the third incoming signals at a second uplink frequency associated with a second downlink frequency transmitted by the second transmitter; and wherein idle mobile telephones in each of the coverage areas are caused to camp on the second downlink frequency whereby access requests from the idle mobile telephones are transmitted on the second uplink frequency, and are received in an appropriate time slot by the second or third receiver depending on the location of the mobile telephone transmitting the access request.

2. A cellular radio communication arrangement as claimed in claim 1 including one or more intermediate coverage areas between the inner and outer coverage areas each having a corresponding intermediate transceiver tuned to respective intermediate uplink and downlink frequencies, there being for each intermediate coverage area an additional receiver adapted to receive immediate uplink signals originating from the corresponding intermediate coverage area and having a frequency the same as the second uplink frequency.

3. An arrangement as claimed in claim 2 wherein the first time frame of each receiver adapted to receive incoming signals from the outer coverage area and me intermediate coverage areas is delayed with respect to the time frame of the inner coverage area by a period equal to or slightly less than twice the time of travel for radio signals from the base station antenna to the inner edge of the corresponding coverage area.

4. An arrangement as claimed in claim 1 wherein one of the first outgoing signals includes a first downlink time frame having a first broadcast control channel which includes a camping bar flag signal which instructs idle mobile phones not to camp en the first downlink and uplink frequencies.

5. A method of increasing the range of a TDMA cellular radio base station in a network arrangement in which the timing of transmissions from mobile telephones can be adjusted over a predetermined range, the base station having a cellular radio communication arrangement including a cellular base station having two or more contiguous or overlapping coverage areas, and a corresponding TDMA transceiver associated with each coverage area, said method including the steps of:

providing an inner transceiver including (1) a first receiver adapted to receive first incoming signals from an inner coverage area, and (2) a first transmitter adapted to transmit first outgoing signals at least to the inner coverage area;

providing an outer transceiver having (1) a second receiver adapted to receive second incoming signals from an outer coverage area, and (2) a second transmitter adapted to transmit second outgoing signals at least to the outer coverage area:

providing an additional third receiver adapted to receive third incoming signals from the inner coverage area;

operating the first and third receivers according to respective first and third receiver time frames which are synchronized;

operating the second receiver according to a second time frame which is delayed with respect to the first and third time frames by a predetermined delay period;

receiving, at the first receiver, the first incoming signals at a first uplink frequency associated with a first downlink frequency transmitted by the first transmitter;

receiving, at the second and third receivers, respectively, the second and the third incoming signals at a second uplink frequency associated with a second downlink frequency transmitted by the second transmitter;

causing idle mobile telephones in each of the coverage areas to camp on the second downlink frequency;

transmitting access requests from the idle mobile telephones, on the second uplink frequency; and receiving, in an appropriate time slot, the access requests received by the second or third receiver, depending on the location of the mobile telephone transmitting the access request.

6. A method as claimed in claim 5 wherein the coverage areas include one or more intermediate coverage areas between the inner and outer coverage areas each having a corresponding intermediate transceiver tuned to respective intermediate uplink and downlink frequencies, there being for each intermediate coverage area an additional receiver adapted to receive intermediate uplink signals originating from the corresponding intermediate coverage area and having a frequency the same as the second uplink frequency.

7. A method as claimed in claim 6 wherein the time frame of each receiver adapted to receive incoming signals from the outer coverage area and the intermediate coverage areas is delayed with respect to the time frame of the inner coverage area by a period equal to or slightly less than twice the time of travel for radio signals from the base station antenna to the inner edge of the corresponding coverage area.

8. A method as claimed in claim 6, wherein the radio base station causes the access grant message to be transmitted on the first down link frequency by the first transmitter and on the second downlink frequency by the second transmitter.

9. A method as claimed in claim 6, wherein the radio base station causes the access grant message to be transmitted on the second downlink frequency by the first transmitter.

10. A method as claimed in claim 5 wherein one of the first outgoing signals includes a first downlink time frame having a first broadcast control channel which includes a camping bar flag signal which instructs idle mobile phones not to camp on the first downlink and uplink frequencies.

11. A method as claimed in claim 5 wherein the radio base station causes access grant messages to be transmitted on the second downlink frequency.

12. A method as claimed in claim 11, wherein the radio base station causes the access grant message to be transmitted on the first down link frequency by the first transmitter and on the second downlink frequency by the second transmitter.

13. A method as claimed in claim 11, wherein the radio base station causes the access grant message to be transmitted on the second downlink frequency by the first transmitter.

14. A method as claimed in claims 5 wherein the radio base station causes access grant messages to be transmitted on the second downlink frequency.

* * * * *